UNITED STATES PATENT OFFICE.

JOSÉ ILLAS, OF HABANA, CUBA.

PROCESS FOR THE AMPLIFICATION OF LINSEED-OIL.

1,303,671.  Specification of Letters Patent.  Patented May 13, 1919.

No Drawing.  Application filed February 12, 1918. Serial No. 216,751.

*To all whom it may concern:*

Be it known that I, José Illas, a citizen of the Republic of Cuba, and a resident of Habana, Republic of Cuba, have invented certain new and useful Improvements in Processes for the Amplification of Linseed-Oil, of which the following is a full, clear, and exact specification.

This invention relates to a solution adapted to be used in almost every field in which at the present time pure linseed oil is used, the manufacture of such solution being much cheaper, due to the fact that the same is composed of ingredients which may be obtained at a comparatively low figure.

This process uses as ingredients the refined petroleum oil and the colophony or rosin which is the residue of distillation of the turpentines or natural resins in which the resin spirit or turpentine is a distillate, and this process is as follows: The refined petroleum oil is put in a pot and an equal quantity of colophony or rosin is dissolved therein by heating and then the mixture is let to rest and cool. Once the mixture is cool, same is poured into another pot and pure linseed oil is added in the proportion of one part of pure linseed oil for one and a half part of the solution, and thoroughly mixed the whole in order that it may become homogeneous, and finally the mixed product is cleaned off of all impurities it may contain if there be any at all.

The resulting product contains petroleum oil, colophony or rosin and pure linseed oil, but for poorer classes the last ingredient can be reduced to a very small quantity, such as may be necessary to just aromatize lightly the solution of refined petroleum oil and colophony or rosin.

What I claim is:

1. A liquid mixture including colophony, petroleum in an amount equal to the colophony, and linseed oil.

2. A liquid mixture including 40% of linseed oil, 30% of petroleum, and 30% of colophony.

In witness whereof I affix my signature.

JOSÉ ILLAS.